April 21, 1970     E. JAULMES     3,507,027
PROCESS OF AND MACHINE FOR CENTERING SPOKED WHEELS
Filed Feb. 26, 1968     3 Sheets-Sheet 1

INVENTOR
ERIC JAULMES
BY    KARL RATH
ATTORNEY

April 21, 1970   E. JAULMES   3,507,027
PROCESS OF AND MACHINE FOR CENTERING SPOKED WHEELS
Filed Feb. 26, 1968   3 Sheets-Sheet 2
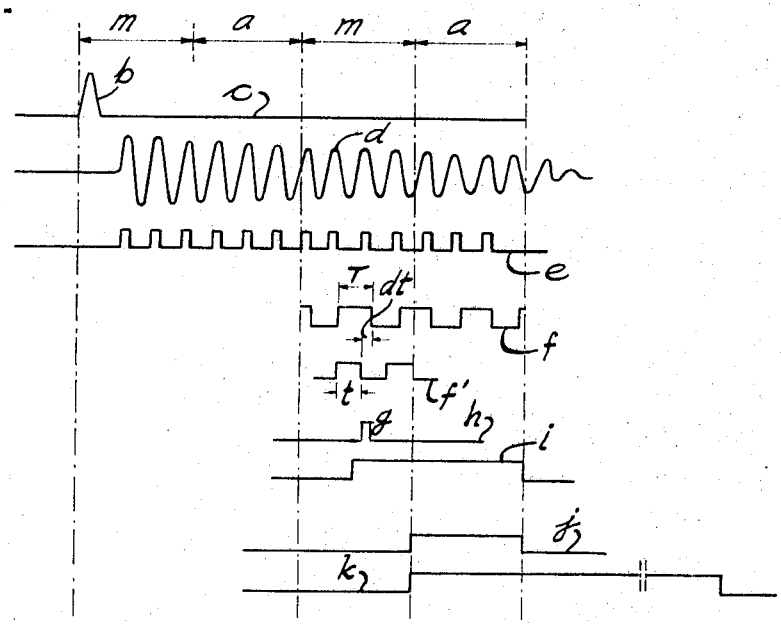
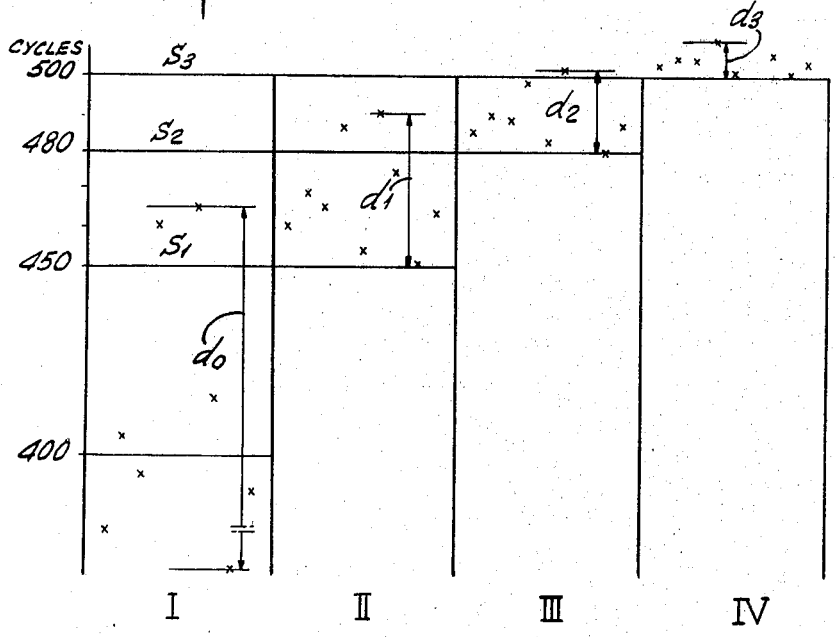
INVENTOR
ERIC JAULMES
BY
KARL RATH
ATTORNEY

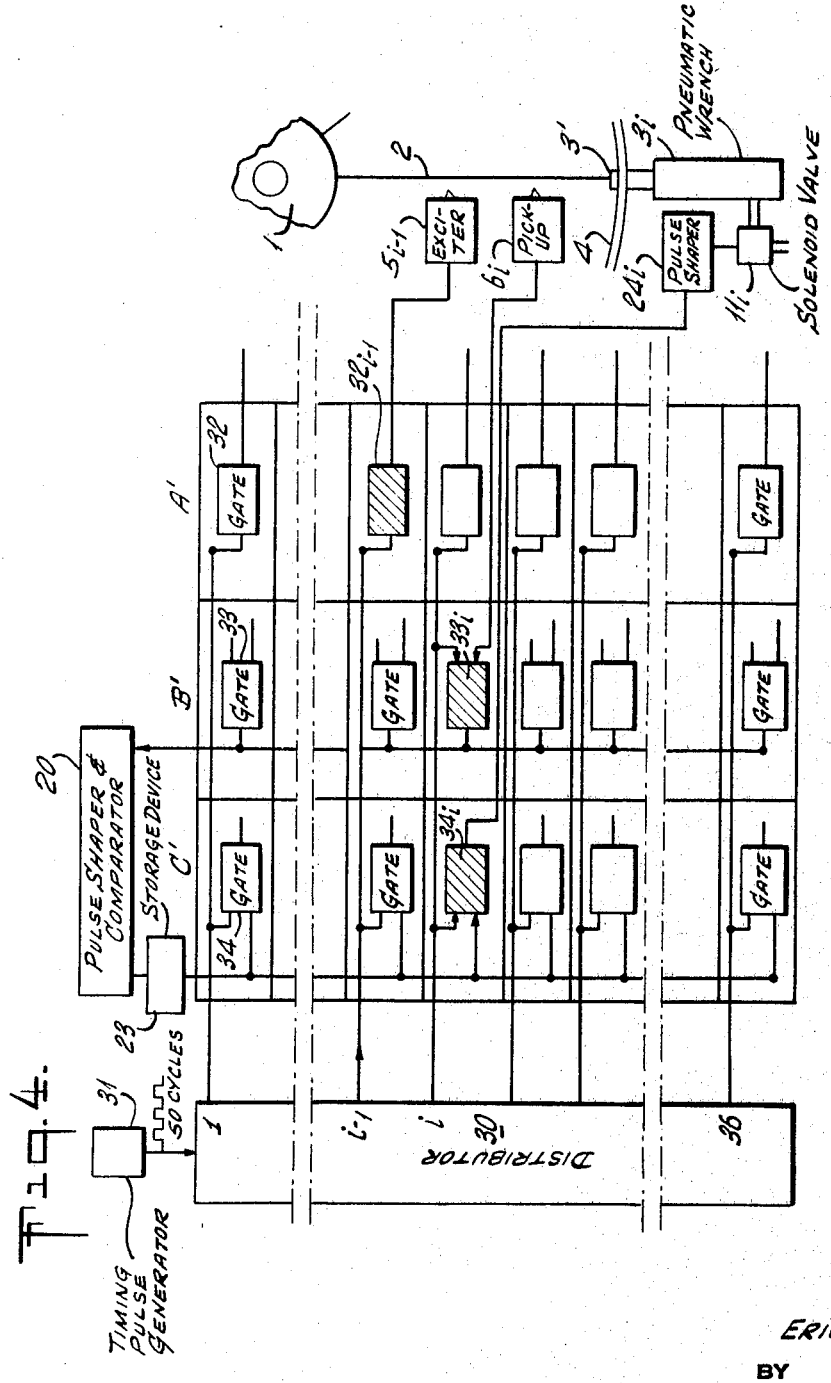

United States Patent Office 3,507,027
Patented Apr. 21, 1970

3,507,027
PROCESS OF AND MACHINE FOR CENTERING SPOKED WHEELS
Eric Jaulmes, Paris, France, assignor to Ateliers de la Motobecane, a corporation of France
Filed Feb. 26, 1968, Ser. No. 708,412
Claims priority, application France, Feb. 27, 1967, 96,566
Int. Cl. B23p 19/00
U.S. Cl. 29—159.02     10 Claims

ABSTRACT OF THE DISCLOSURE

In the centering of spoked wheels, the adjustment of the tensions of the spokes to a desired value, or value within a desired tolerance range, is effected by shock-exciting the spokes by an electromagnetic pulse, detecting the ensuing spoke oscillations by an electric pickup and utilizing the frequency of the detected oscillations for controlling the adjustment of the spoke tensions by means of a solenoid-operated pneumatic spoke tightening wrench. For this purpose, the spoke oscillating frequency is compared with one or preferably a series of reference frequencies. In a preferred embodiment, especially designed for effecting automatic spoke tensioning in conjunction with large-scale manufacture, the spoke oscillations, after conversion into a suitable square wave, are combined in a comparator with a series of step-by-step increasing reference frequencies, the comparator being designed to produce an output pulse only if the frequency of the spoke oscillation exceeds the respective reference frequency. The output pulse is converted into a predetermined operating pulse for the control of the wrench, whereby to result in fixed increments in the positive sense of the tensioning torque of the spokes by each reference frequency or comparator output pulse and, in turn, in an ever closer approximation of the spoke tensions towards a desired final value or tolerance range, as the reference frequency is increased during successive spoke tensioning steps or operations.

---

The present invention relates to a process of and machine for centering spoked wheels, in particular, though not limitatively, bicycle and light motorcycle wheels.

In order to produce a perfect wheel, that is, without wobble or twist, or a wheel being perfectly round and accurately centered, all that is required in practice is to ensure that all the spokes have the same tension, assuming of course, as will be in the following, that the wheel rim is geometrically round or correct. It should however be pointed out that this requirement is not entirely indispensable.

According to previously known methods of centering spoked wheels, the wheels are mounted on a rig which allows warping and off center to be checked. The tensions on the individual spokes are then adjusted by screwing up and unscrewing the spoke tensioning units, until the wheel rotates true. In using such a centering method, the resulting tensions are not necessarily the same on all the pokes.

In order to avoid this empirical and tedious method, which can only be performed by highly skilled and specialized labor, spoke-tensioning machines have already become known which operate by tightening up all the spoke nuts with the same applied torque. This method does not, however, result in the same tension on all the spokes, because the torque which has to be applied to a nut depends, among others, on the clearance between the threads and on the friction between the nut and wheel flange or rim.

Accordingly, an important object of the present invention is the provision of an improved method of and means for tightening the tensioning nuts of a spoked wheel, to obtain the same tension on all the spokes, irrespective of the torques applied to the nuts.

This method, compared with the manual method referred to above, has the advantage that all the spokes subsequently perform under the same conditions, whereas in the case of the previous methods, even though the wheel may rotate true, the tensions on the individual spokes may be different, whereby the spokes perform under different conditions.

With the foregoing object in view and in contrast to the referred to prior method, the present invention utilizes the natural frequency of oscillation of the tensioned spokes as a means for sensing and adjusting the spoke tensions to a desired value, or value within a desired tolerance range. According to one feature of the invention, the same involves the application to a spoke to be adjusted of a mechanical impulse, to cause the spoke to oscillate at its natural frequency, the sensing or measurement of said frequency and screwing up of some of the nuts and unscrewing of others, in a manner to adjust all of the spokes to the same natural frequency and, in turn, uniform tension, respectively.

A requirement for the carrying out of such a process is that the spokes must not touch each other at their crossing points and that the flange of the wheel hub to which the spokes are anchored must be wide enough to ensure this condition under all circumstances.

A more specific object of the invention is the provision of an electronically controlled automatic spoke-tensioning machine utilizing the basic spoke-tensioning process of the invention and being especially suited for use in conjunction with automatic high-output quantity production of bicycle, motorcycle and the like spoked wheels.

The preferred process utilized for the latter purpose involves essentially a series of nut-tightening steps or operations, that is, without loosening or unscrewing of the nuts during the automatic adjusting operations. More particularly, the nuts are first given, in a preliminary operation, an initial screwing up and they are then tightened further, in a first operating step, to a certain degree so as to raise the natural frequency of oscillation of each spoke up to and above a certain reference of threshold frequency. The tightening operation is then repeated in a second step, using a higher threshold or reference frequency. As a consequence, the scatter or range of variation of the tensions between the different spokes of a wheel is reduced by this operation. During subsequent and similar operating steps, utilizing step-by-step increasing reference frequencies, the scatter further decreases accordingly. In practice, it has been found enough to apply three tensioning steps or operations, to approximate or bring the variation in oscillating frequency, and, in turn, of the spoke tension, between the spokes down to a practically tolerable value. The use of tightening operations only in fixed amounts or increments greatly simplifies the mechanical design of the machine and results in increased operating effectiveness and safety, as will become more apparent as the description proceeds.

The threshold frequencies may for example be 400 cycles per second for the preliminary screwing up process, followed by steps using 450 cycles, 480 cycles and finally 500 cycles as threshold or reference frequencies for the successive tightening up operations.

In carrying into effect the invention, a machine is used in which the wheel is mounted. All the spokes are then excited in succession to oscillate by applying thereto a pulse from electromagnetic exciters operated preferably by discharging an electrical capacitor through a relay, such as a thyristor or SCR (silicon controlled rectifier) of known type in the art.

After a spoke has been caused to oscillate in this way at its natural frequency, the oscillations are sensed or detected by an electromagnetic pickup or detector adapted to produce electrical signals at the frequency of the spoke oscillations. As will be understood, there are as many exciters and detectors as there are spokes in a wheel. The exciters and detectors are activated in succession by a rotary or electronic distributor switch operated at a suitable speed by an electric motor or clock frequency, respectively.

The frequency of the output signal of the detector is measured in multiples of a standard frequency, for example 100 kilocycles, produced by an oscillator, preferably a quartz oscillator, and applied to the frequency meter or comparator. In the automatic tensioning machine, the spoke frequency is compared with a fixed reference or threshold frequency, for example 450 cycles. If the spoke frequency is higher than the reference frequency, no output signal is supplied by the comparator. If, on the other hand, the spoke frequency is lower than the reference frequency, the comparator produces an output pulse which may be stored by known means and shaped to activate an electromagnetic valve which, in turn, initiates the rotation of a nut tightener in the form of a pneumatic wrench arranged to tighten up the nuts at the ends of the spokes.

Furthermore, in the preferred embodiment of the invention each nut tightening wrench rotates its nut only a fraction of a revolution at a time, for example 1/12 turn, and then stops. In this way, two or more wrenches can be rotating simultaneously on successive spokes, that is to say their actions overlap in time and consequently the transition from one spoke to the next is not held back by the time necessary for the tightening of each nut. In practice and by way of example, a spoke can be checked in 1/50 of a second, while a wrench operates on the corresponding nut for a duration of the order of 1/3 of a second, rotating the wrench through, for instance, 1/12 of a revolution.

Preferably, the distributor divides the operation into two successive phases, a sensing or measurement phase and an active or control phase, which succeed each other in alternation, each of said phases having the same duration, that is, 1/100 of a second in the example mentioned.

Furthermore, in the preferred embodiment of the invention the signal supplied by each detector at regular intervals in the form of a damped sine wave is transformed by known means into a rectangular or square wave pulse signal suitable for comparison with a similar signal of standard or reference frequency. For this purpose, the rectangular pulse resulting from the sine wave may at first have a duration different from that of the interval between pulses, although the sum of a pulse duration and interval is a constant, this constituting the period of the signal. This signal is then transformed into a pulse signal of half the frequency of the original sine wave in which the pulses and intervals are of equal length, that is, constituting a true square wave. Furthermore, means are provided to ensure that the signal comparison begins at the starting instants of the spoke and reference pulse signals, respectively.

Besides, the function of the comparator is such that if the measured pulse duration is lower than the duration of the reference pulse, a control pulse is produced in the output of the comparator. On the other hand, if the measured pulse duration is higher than the duration of the reference pulse, no output is produced by the comparator. The output pulse may first of all be stored or delayed and then distributed by the distributor and shaped for the energization of the electromagnetic valve actuating the nut-tightening wrench during a fixed duration or tightening cycle, the time delay of the actuating pulse serving to make up for the mechanical inertia of the valve.

The invention, both as to the foregoing and ancillary objects as well as novel aspects thereof, will be better understood from the following detailed description of a preferred embodiment of an automatic spoke-tensioning machine, taken in conjunction with the accompanying drawings forming part of this specification and in which:

FIG. 2 is a series of theoretical diagrams explanatory of the function and operation of the machine shown by FIG. 1;

FIG. 3 is a further theoretical diagram illustrative of the effects of the successive spoke-tensioning steps according to the operating method embodied in the machine shown by FIG. 1; and FIG. 4 illustrates in block diagram form alternative automatic spoke-tensioning apparatus similar to FIG. 1 but utilizing electronic measurement and control means throughout.

Like reference characters denote like parts and magnitudes in the different views of the drawings.

Figure 1:
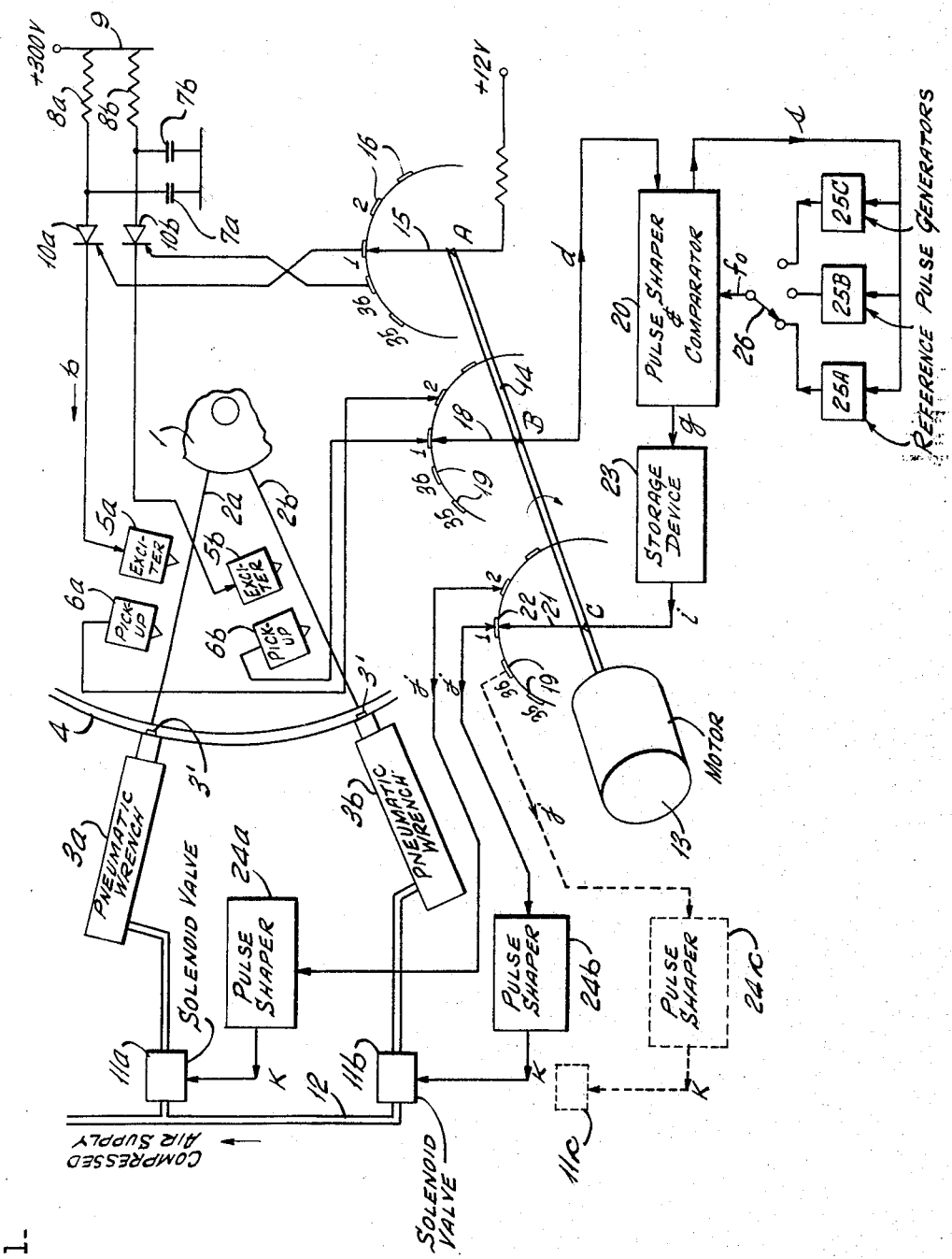
FIG. 1 is a combined schematic representation and wiring diagram of an automatic spoke-tensioning machine constructed in accordance with the principles of the invention and embodying a mechanically operated distributor.

Referring more particularly to FIG. 1, the hub of a wheel is represented diagrammatically at 1, the spokes are shown at $2a$, $2b$ . . . and at $3a$, $3b$ . . . there are shown the pneumatic tightening wrenches which act on the nuts $3'$ to tighten up the spokes. The pneumatic wrenches operate outside the wheel rim 4 and, while there are as many wrenches as there are spokes, only two are shown in the drawing for the sake of clarity.

In accordance with the invention there is provided an exciter $5a$, $5b$ . . . and a detector or pickup $6a$, $6b$ . . . for each spoke $2a$, $2b$ . . . . Each exciter, which may be in the form of an electromagnet acting on a spoke, is controlled by the discharge from a capacitor $7a$, $7b$ . . . the latter being charged, through a charging resistor $8a$, $8b$ . . . from a high voltage direct current source or line 9, supplying direct current at for example 300 volts. The discharge of the capacitors are controlled preferably by solid state relays, such as SCR's (silicon controlled rectifiers) or thyristors $10a$, $10b$ . . . of well known design.

Each pneumatic wrench $3a$, $3b$ . . . is controlled by an electromagnetic (solenoid) valve $11a$, $11b$ . . . respectively, which is connected to a common compressed air supply 12.

The rotary switch or distributor assembly is driven by a motor 13 and consists of three commutator or switching drums A, B and C. Each commutator drum has a wiper arm 15, 18 and 21 mounted upon a shaft 14 driven by the motor 13 and serving to contact in sequence 36 electric stationary contacts 16, 19 and 22, respectively, assuming the wheel to have 36 spokes $2a$, $2b$ . . . . In regard to the drum A, the wipers 15 make contact successively with the stationary contacts 16, each of which is connected to the gate of one of the thyristors $10a$, $10b$ . . . so as to trigger the thyristors by control pulses derived from a suitable source, for example a 12 volt source of direct current as indicated. In this way, all the spokes $2a$, $2b$ . . . are successively caused to vibrate or oscillate, one after the other and during a single operating step or round of the machine.

In regard to the contact drum B, the contacts 19 thereof are displaced by one switching step or unit relative to the contacts 16 of the drum A, while the wiper 18 makes contact successively with the 36 stationary contacts 19, whereby to feed to the pulse shaper and comparator 20 the sinusoidal spoke oscillation $d$ supplied by the respective detectors $6a$, $6b$ . . . . In regard to the contact drum C, its wiper 21 makes contact successively with the 36 stationary contacts 22, whereby to feed the output signals $h$ of the comparator, after preliminary storing in the device 23 and via the 36 pulse shapers or delay units $24a$, $24b$ . . . to the 36 solenoid valves $11a$, $11b$ . . . respectively. As already mentioned above, each solenoid valve remains open during the operating period of the corresponding pneumatic wrench 3a, 3b . . . that is, the pneumatic wrench performs a number of fixed partial revolution, for instance, 1/12 of a revolution in 1/3 of a second according to the example mentioned.

Items 25A, 25B and 25C represent standard or reference generators selectively connectible, through a switch 26, to the comparator 20, the latter further supplying synch pulses to said generators, to phase-synchronize or coincide the starting times of the pulses being compared, in the manner as will become further apparent as the description proceeds.

The sequence of operations during a spoke tightening cycle or period will now be described in the following with further reference to FIG. 2.

The working periods of a spoke tensioning operation are divided by the rotary switches A and B into two alternating phases of equal duration, one of which, that is, phase $m$ constitutes the sensing or measurement phase and the other phase constitutes the active or control phase $a$. Each of these phases may have a duration of for example one of 1/100 of a second, advantageously derived from a 50 cycle power network. At the beginning of each measurement phase $m$, the respective exciter, triggered by the commutator A, applies a brief pulse $b$ to the respective spoke, as shown by the signal $c$ in FIG. 2, causing thereby the spoke to oscillate at its natural frequency and attenuation as shown by signal $d$ representing a damped sine wave or oscillation. The latter is detected by the respective detector 6a, 6b . . . whose electric output signal is applied to the commutator B. This signal, being initially of sine shape, is first converted, in the device 20, to a rectangular shape as shown at $e$ and then into its final shape $f$. The latter constitutes a true square wave having pulses and intervals of equal width or duration and a frequency one half the frequency of the oscillation $d$.

The pulse half period T of the signal $f$ is compared with the reference period $t$ for each pass or operating step of a number of local signals of fixed reference frequencies, for example 450 cycles for the first step, 480 cycles for the second step and finally 500 cycles for the last step, said local signals being produced by the generators 25A, 25B and 25C, respectively, and selectively applied through the control switch 26. If the half period T is greater than the half period $t$ of the reference signal, that is, if there is a positive differential between T and $t$ as shown in FIG. 2, the comparator 20 delivers a control or output pulse gas represented by the signal $h$. On the other hand, if T is less than $t$, no output pulse is produced by the comparator as pointed out.

The signal $g$ is too short to be used directly and is therefore first applied to the memory or pulse stretcher 23 whose output is a pulse as represented at $i$. The latter reaches the commutator C in the form shown at $j$ and is then applied to the further delay or shaper unit 24a, 24b . . . wherein it is given a duration compatible with the time constants of the electromagnetic valves 11a, 11b . . . and of the associated pneumatic wrenches 3a, 3b . . . for instance 1/12 of a revolution in 1/3 of a second according to the example mentioned. The signal $k$ in FIG. 2 represents this last phase of the conversion of the input signal $d$ supplied by the detectors or sensing devices, 6a, 6b . . . .

The operation of the spoke tensioning machine according to the invention, which functions by successive approximations all in the positive or spoke tightening direction and which is capable of effectively reducing the range of variations in the tensions between the spokes, without ever reversing the direction of rotation of the wrenches, is furthermore illustrated in FIG. 3, wherein columns I, II, III, and IV represent, respectively, the results of the pre-tensioning, of the first tightening step or round to give a lower limit of 450 cycles, of the second tightening step or round to give a lower limit of 480 cycles, and of the third or final tightening step or round to give a lower limit of 500 cycles, respectively, the frequency being represented upon the ordinate in the diagram.

As will be seen, after the pre-tensioning to approximately 400 cycles as shown by column I, some of the spokes may exhibit tensions, as indicated by the small crosses in the drawing, extending over a range to from 350 to 465 cycles approximately. After the first spoke tightening step, to give a lower limit of 450 cycles, as shown by column II, the scatter of the spoke tensions has been reduced to a range $d1$ which is always positive and amounts to only approximately 40 cycles. After the second tightening step, as shown by column III, to tensions above the lower limit of 480 cycles, the scatter $d2$ is now over a range of only 20 cycles. Finally, after the third tightening step, as shown by column IV, to give a lower limit of 500 cycles, the scatter $d3$ is now only about 10 cycles and always in the positive or spoke-tightening direction. This final result can be regarded as the practical equivalent to having perfectly uniform tensions on all the spokes of the wheel.

As pointed out, the electronic circuitry of the devices 20, 23, 24, for converting the original sinusoidal spoke oscillation $d$ into the final control pulse $k$ of predetermined length and suitable for the operation of the solenoid valves 24a, 24b . . . and wrenches 3a, 3b . . . during each of the successive operating steps or rounds, may consist of conventional and well known pulse shaping and converting circuits or devices. Thus, the oscillation $d$ may at first be squared and reduced to a signal $f$ of frequency equal to one half of the oscillating frequency by means of well-known pulse shaping and frequency dividing circuits. Similarly, the reference square wave signals $f'$ may be produced by crystal oscillators 25A, 25B and 25C also including wave shaping and frequency dividing circuits of known construction.

In the example shown, assuming equal measuring and control periods $m$ and $a$ of each 1/100 second, and assuming further the spoke oscillating frequency to vary within the range of 300 to 500 cycles, there obtains practically a single pair of square wave half periods of duration T and t, respectively, during a measurement or comparison period $m$, which may be phase-synchronized by suitable means to provide coinciding starting time positions as shown. In FIG. 1, this synchronization of the periods T and $t$ is indicated by a signal $s$ being applied from the comparator 20 to the oscillators 25A, 25B and 25C.

The comparison device to determine the positive difference between T and $t$ may be in the form a simple difference-forming circuit adapted to produce a positive pulse $g$ for T being greater than $t$ and producing a negative pulse $g$ for T being smaller than $t$, respectively. The negative pulse $g$ may be eliminated in a known manner by a pulse clipper, to produce output pulses $g$ only if T exceeds the value of $t$. The conversion of the latter into the final actuating pulse $k$ may be effected by additional known pulse shaping and/or delay or stretching circuits or devices.

As already mentioned above, the pneumatic wrenches may be controlled entirely electronically, the mechanical rotary distributors of FIG. 1 being in this case replaced by an electronic switching circuit performing the same function. An arrangement of this type is shown diagrammatically in FIG. 4. Referring to the latter, the distributor of FIG. 1 is replaced by an electronic circuit 30 being fed by AC current at 50 cycles converted into a square wave by the device 31. This distributor has output terminals 1–36, similar to the distributor of FIG. 1.

More particularly, in place of the three distributor drums A, B and C of FIG. 1, there are here provided three groups of logical circuits A', B' and C', respectively, containing the following circuit arrangements. The logical circuit A' contains 36 gates 32 adapted to perform the functions of the wiper arm 15, drum contacts 16 and of the devices 7, 8, and 10 of FIG. 1. The logical circuit B' contains 36 gates 33 adapted to perform the functions of the wiper arm 18 and drum contacts 19 of the commutator B of FIG. 1, while the logical circuit C' contains 36 gates 34 adapted to perform the functions of the wiper arm 21 and drum contacts 22 of the commutator C of FIG. 1.

The devices which are common to both FIGS. 1 and 2 are the comparator and pulse shaper 20, the memory 23, the delay units 24a, 24b . . . the solenoid valves 11a, 11b . . . the pneumatic wrenches 3a, 3b . . . the exciters 5a, 5b . . . and the detectors 6a, 6b . . . .

The function and operation of the electronic spoke tensioning system according to FIG. 4 is as follows.

Let it be supposed that at the instant $t_{-1}$ a pulse is delivered by the electronic distributor to the line $i_{-1}$. This pulse is modified by the device $32i_{-1}$, shown hatched in the drawing of the logical A' before reaching the exciter $5i_{-1}$, imparting thereby to the respective spoke a pulse to cause the same to oscillate, this operation being analogous to that described in reference to FIG. 1. As a consequence, the detector $6i_{-1}$ delivers a signal applied to the gate $33i$ of the logical circuit B'. This signal can pass only at the instant $t$, that is, on arrival of the signal delivered to the line $i$ by the distributor 30. The simultaneous existence of a signal from a detector and a signal from a distributor corresponds in FIG. 1 to the making of electrical contact between the wiper 18 and one of the contacts 19 of the commutator B. The gate $33i$ in other words performs the logical function of a coincidence or "AND" circuit. The signal from this gate reaches the frequency comparator 20 in which, as before, the period T is compared with the reference period $t$ to produce a control pulse $g$ first stored in the memory 23 and thereafter delivered to the feed line of the logical circuit group C'. This control pulse can pass the gate $34i$ of the group C' only on arrival of a distribution signal on the line $i$. The gate $34i$ also performs therefore the function of a logical coincidence or "AND" circuit. The output signal of the gate 34 reaches the delay unit $24i$ and from there passes to the solenoid valve $11i$ and pneumatic wrench $3i$, in substantially the same manner as described hereinbefore.

As soon as the 36 spokes of the wheel have been given their first tensioning with their oscillation freqeuncies having been brought up to values lower than the second threshold frequency of say 480 cycles, a logical circuit, replacing the selector switch 26 of FIG. 1, then raises the threshold frequency to the next higher level, whereupon the cycle of operations is repeated for each of the 36 spokes, in substantially the same manner as described hereinbefore in reference to FIG. 1.

In the foregoing, the invention has been described in reference to a specific exemplary device or embodiment. It will be evident, however, that variations and modifications, as well as the substitution of equivalent devices or circuits to those shown herein for illustration, may be made without departing from the broader purview and spirit of the invention as set forth in the appended claims. The specification and drawings are accordingly to be regarded in an illustrative rather than in a restrictive sense.

I claim:
1. A method of centering spoked wheels comprising the steps of:
 (1) preliminarily tensioning the spokes of a wheel to be centered,
 (2) exciting the spokes by a mechanical impulse, to cause the same to oscillate at their natural frequencies,
 (3) converting the spoke oscillations into corresponding electric waves, and
 (4) utilizing the frequency of said electric waves as a reference for the adjustment of the spoke tensions to a desired value.

2. A method of centering spoked wheels as claimed in claim 1, said last step comprising comparing said electric waves with a series of reference waves of progressively increasing frequency, and applying a predetermined tensioning force to the spokes whenever the frequency of said electric waves exceeds the respective reference frequency.

3. A method of centering spoked wheels as claimed in claim 1, said preliminary tensioning step resulting in spoke tensions corresponding to frequencies above 400 cycles per second, and said last step comprising successively comparing the electric waves with reference waves of 450, 480 and 500 cycles per second, respectively.

4. Apparatus for the centering of spoked wheels fitted with tensioning nuts for each spoke thereof and comprising in combination:
 (1) spoke nut tightening means,
 (2) means to excite the spokes to oscillate at their natural frequencies,
 (3) pickup means to convert the spoke oscillations into corresponding electric waves, and
 (4) means to utilize the frequency of said electric waves as a reference for the operation of said tightening means, to adjust the spoke tensions to a desired value.

5. Apparatus for the centering of spoked wheels fitted with tensioning nuts for each spoke thereof and comprising in combination:
 (1) electrically actuatable spoke nut tightening means,
 (2) means to excite the spokes to cause the same to oscillate at their natural frequencies.
 (3) pickup means to convert the spoke oscillations into corresponding electric spoke waves,
 (4) a plurality of sources of electric reference waves having fixed frequencies increasing progressively from an initial to a final reference frequency,
 (5) wave comparison and converting means to successively compare a spoke oscillating wave with said reference waves, starting with the lowest and ending with the highest reference frequency, to produce an output signal whenever the spoke oscillating frequency exceeds the respective frequency, and
 (6) means to utilize said output signal for the operation of said spoke-tightening means, to apply substantially constant torque increments to said tightening means in response to each output signal, after preliminarily tightening all said spokes to tensions above a predetermined tension corresponding to a spoke oscillating frequency below the initial reference frequency.

6. Apparatus for the centering of spoked wheels fitted with tensioning nuts for each spoke thereof and comprising in combination:
 (1) a plurality of electrically actuatable spoke nut tightening means, one for each spoke of a wheel to be centered,
 (2) a plurality of electrically controllable exciting means, one for each spoke, to impart an impulse to and to cause the spokes to oscillate at their natural frequencies,
 (3) a plurality of electrical pickup devices, one for each spoke, to convert the spoke oscillations into corresponding electric spoke oscillating waves,
 (4) comparator means including wave-shaping means and means to produce at least one reference wave of predetermined reference requency for comparison with said spoke waves, said comparator means adapted, upon excitation by said spoke waves, to produce an output signal only upon the frequency of a spoke wave exceeding the frequency of said reference wave,
 (5) means including further wave-shaping means and connected to the output of said comparator means, to produce an energizing pulse for said nut tightening means, resulting in predetermined tightening torque increases in response to each output signal of said comparator means, and
 (6) multiple distributor switching means operably connecting said exciting means, said pickup means, said comparator means and said nut tightening means, whereby to successively excite and tighten said spokes and to limit the spoke tensions to values above a lower limit corresponding to said reference frequency, after preliminarily tightening all the spokes to tensions above a predetermined tension corresponding to a spoke oscillating frequency below said reference frequency.

7. In apparatus for the centering of spoked wheels as claimed in claim 6, said comparator means including means to produce a plurality of selectively connectible reference waves of progressively increasing frequencies, to enable a limitation of the spoke tensions to values above the predetermined and progressively increasing limit tensions corresponding to the respective reference frequencies.

8. In apparatus for the centering of spoked wheels as claimed in claim 6, said exciting means consisting of electromagnetic actuators with means to energize the same by the discharge of electrical capacitors via relays controlled by said distributor means.

9. In apparatus for the centering of spoked wheels as claimed in claim 6, said pickup means consisting of magnetic detectors and said comparator means adapted to convert the electrical oscillations supplied by said pickup means into an electrical square wave for comparison with a local reference square wave of predetermined frequency.

10. In apparatus for the centering of spoked wheels as claimed in claim 6, said spoke nut tightening means consisting of pneumatic wrenches controlled by solenoid valves in response to the comparator output signals.

References Cited

UNITED STATES PATENTS

| | | | |
|---|---|---|---|
| 1,609,282 | 12/1926 | Ash | 29—159.02 |
| 3,142,901 | 8/1964 | Bodine | 29—525 |
| 3,224,086 | 12/1965 | Balamuth | 29—526 X |
| 3,328,870 | 7/1967 | Rabinovich et al. | 29—200 |

THOMAS H. EAGER, Primary Examiner

U.S. Cl. X.R.

29—452, 526, 200